(12) United States Patent
Hattori

(10) Patent No.: US 9,716,414 B2
(45) Date of Patent: Jul. 25, 2017

(54) STATOR OF ROTATING ELECTRIC MACHINE

(71) Applicant: Hiroyuki Hattori, Okazaki (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 14/426,592

(22) PCT Filed: Aug. 21, 2013

(86) PCT No.: PCT/IB2013/001880
§ 371 (c)(1),
(2) Date: Mar. 6, 2015

(87) PCT Pub. No.: WO2014/041408
PCT Pub. Date: Mar. 20, 2014

(65) Prior Publication Data
US 2015/0244233 A1   Aug. 27, 2015

(30) Foreign Application Priority Data
Sep. 13, 2012   (JP) .................................. 2012-201597

(51) Int. Cl.
*H02K 3/34* (2006.01)
*H02K 3/24* (2006.01)
(Continued)

(52) U.S. Cl.
CPC ................. *H02K 3/42* (2013.01); *H02K 3/02* (2013.01); *H02K 3/12* (2013.01)

(58) Field of Classification Search
CPC .. H02K 3/02; H02K 3/04; H02K 3/12; H02K 3/32; H02K 3/34; H02K 3/38; H02K 3/40;
(Continued)

(56) References Cited

U.S. PATENT DOCUMENTS 5,311,092 A * 5/1994 Fisher ...................... H02K 1/02
310/179
6,492,757 B2 * 12/2002 Nakamura ............... H02K 3/34
310/179

(Continued)

FOREIGN PATENT DOCUMENTS

JP   S39-26482 B   11/1964
JP   56066148 A * 6/1981 ............... H02K 3/02
(Continued)

OTHER PUBLICATIONS

Partial Translation of Jul. 22, 2014 Office Action issued in Japanese Application No. 2012-201597.

*Primary Examiner* — Tran Nguyen
(74) *Attorney, Agent, or Firm* — Oliff PLC

(57) ABSTRACT

A stator of a rotating electric machine includes plural slots disposed in a circumferential direction of a stator core, and a coil body formed by a coil that is disposed as a single conductor in the slot in the circumferential direction of a stator core and that is wound for plural turns in the slot in a radial direction of a stator core. The coil has a flat conductor section, a magnetic body layer provided around the flat conductor section, and an insulating film provided around the magnetic body layer.

3 Claims, 4 Drawing Sheets

(51) Int. Cl.
*H02K 3/42* (2006.01)
*H02K 3/12* (2006.01)
*H02K 3/02* (2006.01)

(58) Field of Classification Search
CPC .......... H02K 3/42; H02K 19/22; H02K 19/24; H02K 19/36; H01B 7/00; H01B 5/02; H01F 27/00
See application file for complete search history.

(56) References Cited

U.S. PATENT DOCUMENTS

| | | |
|---|---|---|
| 2005/0225197 A1 | 10/2005 | Nagano et al. |
| 2007/0007843 A1* | 1/2007 | Matsubara ............... H02K 3/02 310/179 |
| 2008/0231136 A1 | 9/2008 | Obata |

FOREIGN PATENT DOCUMENTS

| | | |
|---|---|---|
| JP | 2001-292545 A | 10/2001 |
| JP | 2004-166388 A | 6/2004 |
| JP | 2007-020302 A | 1/2007 |
| JP | 2008-236924 A | 10/2008 |
| JP | 2009-232607 A | 10/2009 |
| JP | 2011-210638 A | 10/2011 |
| JP | 2011-222617 A | 11/2011 |
| WO | 2012/077215 A1 | 6/2012 |

* cited by examiner

FIG. 1A
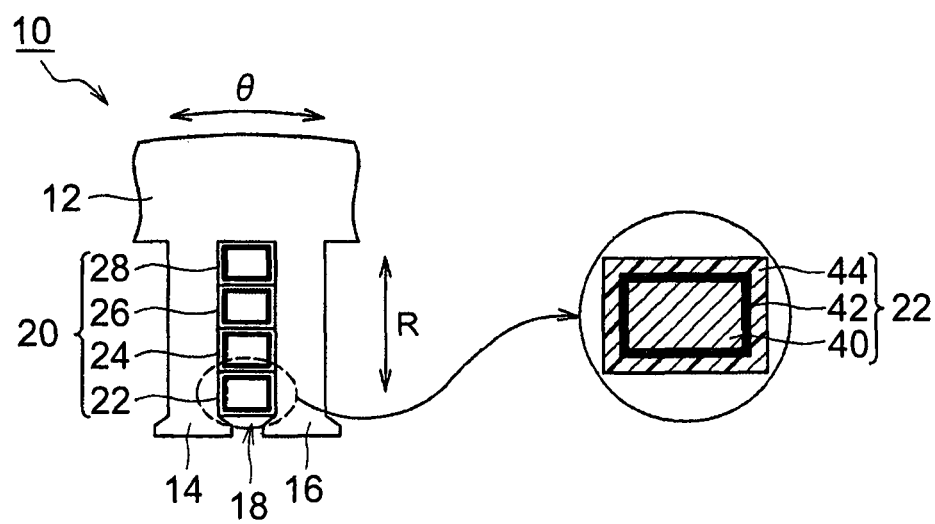
FIG. 1B
FIG. 2
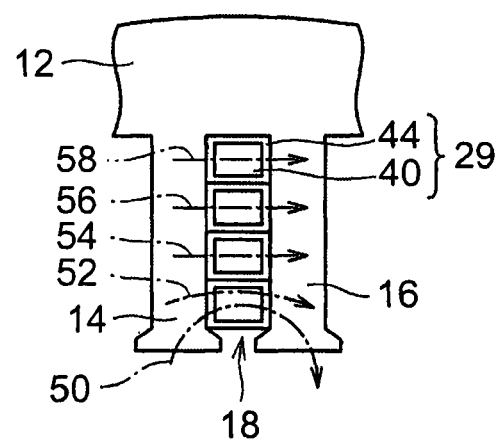

STATOR OF ROTATING ELECTRIC MACHINE

BACKGROUND OF THE INVENTION

1. Field of the Invention

The present invention relates to a stator of a rotating electric machine, and particularly relates to a stator of a rotating electric machine in which a coil winding is wound inside a slot.

2. Description of Related Art

In order to make a rotating electric machine compact and have technical advantages, it is necessary to wind a coil in an efficient manner and reduce loss such as copper loss or iron loss. Japanese Patent Application Publication 2009-232607 (JP 2009-232607 A) discloses that a flat wire having a concave portion and a convex portion is used as a stator winding of a rotating electric machine and that flat-wire coils are disposed in a slot such that the convex portions and the concave portions of the adjacent flat-wire coils are fitted with each other, thereby increasing a space factor of the coils in the slot.

It is described in Japanese Patent Application Publication 2011-210638 (JP 2011-210638 A) that a magnetic body layer that serves as a wire used for a coil of an electromagnet is provided on a surface layer of a conductor to increase an attractive force of the electromagnet. In an embodiment where this wire is used as a winding for a distributed winding coil of the stator in the rotating electric machine, the plural wires having a circular cross section are accommodated in a single slot.

It is disclosed in Japanese Patent Application Publication 2008-236924 (JP 2008-236924 A) that thickness of an insulating layer coated on a flat coil wire or a type of an insulating material is changed between a coil end portion and a slot portion to reduce the size of the rotating electric machine. It is also described that, as a field buffer layer that reduces a steep surge voltage of an inverter, an electroconductive polymer layer or a layer of epoxy resin or the like in which a conductive filler or a semi-conductive filler is mixed is provided on a surface of a coil conductor or a surface of the insulating layer.

Although the space factor can be increased with use of the flat wire that has the concave portion and the convex portion, eddy-current loss that is caused by a leakage magnetic flux may be increased due to a reduced resistance value of the conductor that consequently promotes a current flow. The eddy-current loss can be reduced by providing the magnetic body layer on the surface layer of the conductor. However, the space factor is reduced by the thickness of the magnetic body layer.

SUMMARY OF THE INVENTION

The present invention provides a stator of a rotating electric machine that can increase a space factor of a coil winding in a slot and that can reduce eddy-current loss. The stator of the rotating electric machine according to one aspect of the present invention includes: plural slots disposed in a circumferential direction of a stator core; and a coil body formed by a coil, the coil being disposed as a single conductor in the slot in the circumferential direction of the stator core, and the coil being wound for plural turns in the slot in a radial direction of the stator core. The coil has a flat conductor section, a magnetic body layer provided around the flat conductor section, and an insulating film provided around the magnetic body layer.

According to the above aspect, because a leakage magnetic flux in the stator of the rotating electric machine passes through the magnetic body layer provided around the flat conductor section but does not pass through the flat conductor section, it is possible to reduce the eddy-current loss in the flat conductor section. Therefore, it is possible to reduce the eddy-current loss while increasing the space factor by use of a flat wire.

In addition, in the stator of the rotating electric machine according to the above aspect, the coil having the magnetic body layer in the coil body may be disposed one turn apart from each other in the radial direction.

In the stator of the rotating electric machine, the magnetic body layers are overlapped between the adjacent coils among the coils that are wound for plural turns in the radial direction. Accordingly, the coils having the magnetic body layer are disposed one turn apart from each other in the radial direction. Therefore, it is possible by removing the overlapped magnetic body layers to further increase the space factor of the coil body in the slot and to effectively reduce the eddy-current loss.

Furthermore, in the stator of the rotating electric machine according to the above aspect, the coil of one turn having the magnetic body layer in the coil body may only be disposed on an innermost peripheral side of the slot.

A leakage magnetic flux from a rotor that passes through the stator of the rotating electric machine is high on the innermost peripheral side in the radial direction. The coil having the magnetic body layer is only disposed on this innermost peripheral side, and the magnetic body layer is not provided for coil of the other turns. Therefore, it is possible to effectively reduce the eddy-current loss and to further increase the space factor of the coil body in the slot.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a cross-sectional view of a slot that shows a structure of a stator of a rotating electric machine according to an embodiment of the present invention;

FIG. 1B is a cross-sectional view of a coil that shows the structure of the stator of the rotating electric machine according to the embodiment of the present invention;

FIG. 2 is a view for showing eddy-current loss when coils of related art are used for a comparison;

DETAILED DESCRIPTION OF EMBODIMENTS

Figure 3:
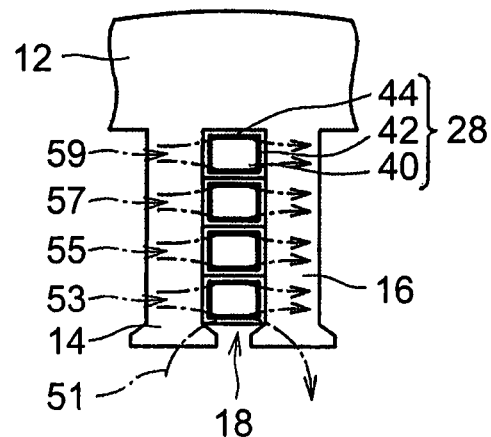
FIG. 3 is a view for showing the reduced eddy-current loss in a configuration of FIG. 1A.

A detailed description will hereinafter be made on an embodiment of the present invention with reference to the drawings. In the following description, a coil body is wound according to a distributed winding method. However, the coil body may be disposed as a single conductor in a slot in a circumferential of a stator core direction and wound for plural turns in the slot in a radial direction of the stator core. For example, the coil body includes one that is wound by a wave winding method. In addition, a flat conductive wire with a rectangular cross section is used as a coil in the following description. However, a conductive wire having a substantially rectangular cross section whose corners are rounded, a conductive wire having a substantially ellipsoidal cross section, or the like may be used. The number of slots in the stator core, and the number of turns, dimension, thickness and the like of the coil, which will be described below, are for an illustrative purpose only, and thus they can appropriately be changed according to a specification of a stator in a rotating electric machine.

The same or corresponding elements are denoted with the same reference numerals below, and their description will not be repeated.

FIG. 1 is a view for showing a stator 10 of a rotating electric machine, in which FIG. 1A is a cross-sectional view of a slot and FIG. 1B is a cross-sectional view of the coil. The stator 10 of the rotating electric machine is combined with a rotor, which is not shown, to form the rotating electric machine, rotates the rotor in cooperation with the rotor by means of electromagnetic action generated by a passage of electric current to the coil, and outputs torque to a rotating shaft of the rotor.

The stator 10 of the rotating electric machine includes a stator core 12, plural teeth 14, 16 that are disposed in a circumferential direction of the stator core 12, a slot 18 that is a space between the adjacent teeth 14, 16, and a coil body 20 that enters the slot 18 and is wound for plural turns.

Figure 8:
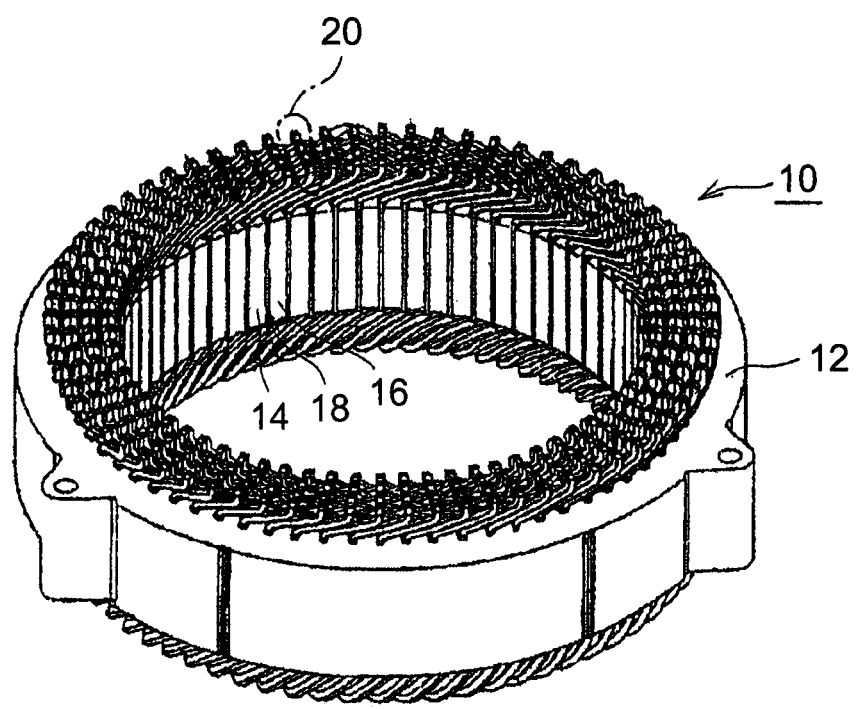
FIG. 8 is a perspective view of the stator of the rotating electric machine according to the embodiment of the present invention.

The stator core 12 is a circular magnetic body member in which the plural teeth 14, 16 are disposed on an inner peripheral side thereof. FIG. 8, which will be described later, shows the stator core 12 having 72 of the teeth 14, 16. Such a stator core 12 is formed by stacking plural electromagnetic steel plates in a specified shape.

As shown in FIG. 1A, the coil body 20 is formed when the coils, each of which is disposed as a single conductor in the slot 18 in the circumferential direction, are wound for plural turns in the slot 18 in the radial direction. In FIG. 1, the circumferential direction is a direction θ while the radial direction is a direction R. In FIG. 1, the coil body 20 is formed of coils 22, 24, 26, 28 of four turns that are aligned in the radial direction. Each of the coils 22, 24, 26, 28 is disposed between one end and another end of the slot 18 in the circumferential direction and is wound only for one turn. In other words, each of the coils 22, 24, 26, 28 is disposed as the single conductor in the slot 18 in the circumferential direction.

Each of the coils 22, 24, 26, 28 is inserted from one side of the stator core 12 in an axial direction, passes through the slot 18, exits from the other end thereof, and is inserted in another slot that is six slots away from the slot along the circumferential direction of the stator core 12. Accordingly, each of the coils 22, 24, 26, 28 constitutes a stator winding according to the distributed winding method in which the above process is performed repeatedly.

As shown in FIG. 1B, the coil 22 includes a flat conductor section 40, a magnetic body layer 42 that is provided around the flat conductor section 40, and an insulating film 44 that is provided around the magnetic body layer 42.

The flat conductor section 40 is a conductive wire having a rectangular cross section that is perpendicular to a direction in which the conductor extends. A highly conductive metal can be used as a conductor material. As the highly conductive metal, copper or the like can be used.

The magnetic body layer 42 is a ferromagnetic body layer having conductivity with which an entire outer periphery of the flat conductor section 40 is coated in a uniform and continuous manner. A material used for the magnetic body is an iron-nickel alloy, and a method of plating is used to form the magnetic body layer 42 on the outer periphery of the flat conductor section 40. In one example, thickness of the magnetic body layer 42 is approximately 1 μm. A material used for the magnetic body may be a soft magnetic material, iron, or nickel.

The insulating film 44 is an electrically insulating resin layer with which an entire outer periphery of the magnetic body layer 42 is coated in the uniform and continuous manner. An enamel coating composed of polyamideimide is used for the insulating film 44. Thickness of the insulating film 44 is determined by the insulating specification of the stator 10 of the rotating electric machine or the like. In one example, the thickness is approximately 30 to 35 μm. The enamel coating used for the insulating film 44 may be of polyesterimide, polyimide, polyester, formal, or the like. Alternatively, a glass fiber coating may be used in which a glass fiber is wound and impregnated with an alkyd resin or the like. In addition to the formation of a film by coating, either a film composed of polyimide, polyester, polyethylene naphthalate, or the like or a thin film sheet may be wrapped.

As for the coil 22, only the single conductor is disposed in the circumferential direction of the slot 18. In other words, the coil 22 of only one turn is disposed in the circumferential direction in the slot 18. The flat conductor section 40 of the coil 22 has the rectangular cross section, and each side of the rectangular shape is parallel with or perpendicular to an inner wall surface of the slot 18. Accordingly, the magnetic body layer 42 has a rectangular frame shape, and each side of the rectangular frame shape is also parallel with or perpendicular to the inner wall surface of the slot 18.

A detailed description will be made on advantages of the above configuration with reference to FIG. 2 and FIG. 3. These drawings correspond to FIG. 1B, and the coils of four turns are disposed in the radial direction of the slot 18. Of the coils of four turns, only one of them is denoted with a reference numeral. FIG. 2 shows an example using a coil 29 of related art that is not provided with the magnetic body layer and only has the flat conductor section 40 and the insulating film 44. FIG. 3 is a view that corresponds to FIG. 1B, and a coil 28 that is provided with the magnetic body layer 42 is used.

FIG. 2 shows directions of leakage magnetic fluxes 50, 52, 54, 56, 58 that are leaked from a rotor side of the rotating electric machine to the stator core 12 side. The leakage magnetic flux passes through the coil 29 in the slot 18 when it enters the tooth 14 from the rotor side and then to the tooth 16. The coil 29 is formed of the flat conductor section 40 made of copper and the insulating film 44 of an insulating body, and has lower magnetic permeability than the teeth 14, 16. Accordingly, the directions of the leakage magnetic fluxes 50, 52, 54, 56, 58 are not influenced by the presence or absence of the coil 29. In consideration of above, it can be understood that the leakage magnetic fluxes 50, 52, 54, 56, 58 pass through a copper portion of the flat conductor section 40 in the coil 29, and this is where the eddy-current loss occurs.

In FIG. 3, the coil 28 has the magnetic body layer 42 with which the periphery of the flat conductor section 40 is coated. Because the magnetic body layer 42 is a ferromagnetic body, the magnetic permeability thereof is hundreds of times higher than the magnetic permeability of the flat conductor section 40 that is made of copper. Accordingly, the magnetic fluxes tend to pass through the magnetic body layer 42 instead of the flat conductor section 40 made of copper. As shown in FIG. 3, leakage magnetic fluxes 51, 53, 55, 57, 59 from the rotor side pass through the magnetic body layer 42 but does not pass through the flat conductor section 40 made of copper. Therefore, compared to a case in FIG. 2, the eddy-current loss that occurs in the flat conductor section 40 is significantly reduced.

In addition, the magnetic body layer 42 is not a separate component that is combined with the flat conductor section 40, but is integrally formed with the magnetic body layer 42 by plating such that the periphery of the flat conductor section 40 is coated therewith. Accordingly, a special assembling process is not necessary to dispose the magnetic body layer 42, and thus the flat conductor section 40 and the magnetic body layer 42 are not displaced with respect to each other when the coils 22, 24, 26, 28 are inserted and wound in the slot 18.

Figure 4:
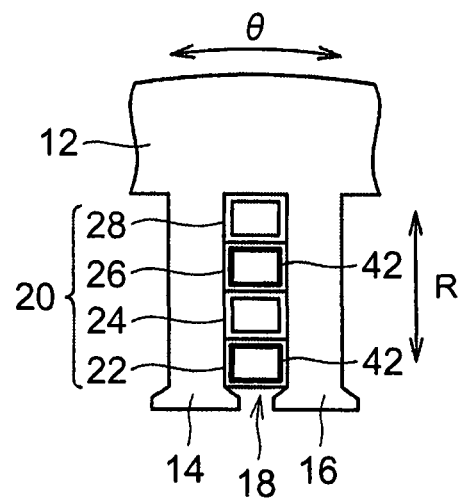
FIG. 4 is a view for showing another example of arrangement of the coils having a magnetic body layer.

FIG. 4 is a view for showing a configuration in which, among the coils 22, 24, 26, 28 of four turns that are disposed in the radial direction of the coil body 20, only the coils 22, 26 that are disposed one turn apart from each other in the radial direction are provided with the magnetic body layer 42 while the coils 24, 28 are not provided with the magnetic body layer 42. If the magnetic body layer 42 is provided for all of the coils 22, 24, 26, 28 as shown in FIG. 1B, the magnetic body layers 42 are circumferentially overlapped between the adjacent coils due to the rectangular cross sections of the coils 22, 24, 26, 28. In FIG. 4, the coils 22, 26 that have the magnetic body layer 42 are disposed one turn apart from each other, and thus two of the overlapped magnetic body layers 42 are removed.

Figure 5:
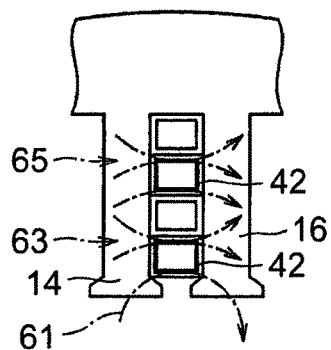
FIG. 5 is a view for showing the reduced eddy-current loss in a configuration of FIG. 4.

FIG. 5 shows directions of leakage magnetic fluxes 61, 63, 65 in the configuration shown in FIG. 4. The magnetic body layer 42 has the magnetic permeability that is hundreds of times higher than copper. Accordingly, even when one of the circumferentially overlapped magnetic body layers 42 between the adjacent coils is removed, the directions of the leakage magnetic fluxes 61, 63, 65 are hardly changed from those shown in FIG. 3. In addition, among the coils 22, 24, 26, 28 of four turns that are accommodated in the single slot 18, the coils 24, 28 of two turns are not provided with the magnetic body layer 42. Accordingly, it is possible to increase a sectional area of the flat conductor section 40 of each of the coils 22, 24, 26, 28 by thickness of the magnetic body layers 42 that are not provided in the coils 24, 28. Therefore, compared to the configuration in FIG. 1B, it is possible to minimize a reduction in a space factor that is caused by providing the magnetic body layer 42 while equally reducing the eddy-current loss, and thus it is possible to restrict a reduction in copper loss that is caused by providing the magnetic body layer 42.

Figure 6:
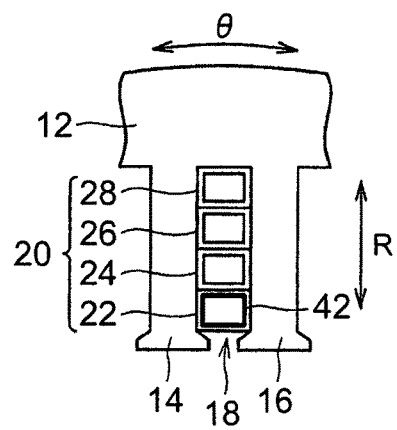
FIG. 6 is another example of arrangement of the coils having the magnetic body layer.

FIG. 6 is a view for showing a configuration in which, among the coils 22, 24, 26, 28 of four turns in the radial direction of the coil body 20, only the coil 22 of one turn that is disposed on an innermost peripheral side of the slot 18 has the magnetic body layer 42. The leakage of magnetic flux from the rotor side is higher in a position near the rotor and is lower in a position away from the rotor. Accordingly, the eddy-current loss that is caused by the leakage magnetic flux is the highest in the coil 22 on the innermost peripheral side of the slot 18, while the eddy-current loss is gradually reduced in the order of the coils 24, 26, 28 that are disposed on the outer peripheral side in the slot 18.

Figure 7:
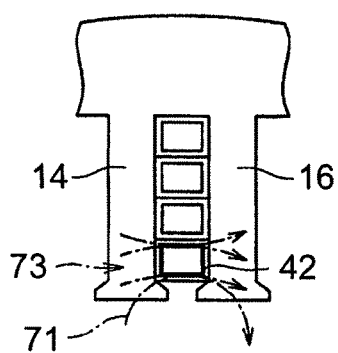
FIG. 7 is a view for showing the reduced eddy-current loss in a configuration of FIG. 6.

FIG. 7 shows directions of leakage magnetic fluxes 71, 73 in the configuration shown in FIG. 6. Because the coil 22 on the innermost peripheral side in the slot 18 has the magnetic body layer 42, the leakage magnetic flux 71 having the highest amount of magnetic flux can pass through this magnetic body layer 42. This prevents the leakage magnetic flux 71 from passing through the flat conductor section 40 in the coil 22 on the innermost peripheral side. Meanwhile, the coil 24 that is adjacent to the coil 22 on the outer peripheral side is not provided with the magnetic body layer 42. Because the leakage magnetic flux 73 is introduced to and passes through the magnetic body layer 42 of the coil 22, the leakage magnetic flux 73 hardly passes through the flat conductor section 40 of the coil 24. Furthermore, although the coils 26, 28 provided on the further outer peripheral side are not provided with the magnetic body layer 42, the leakage magnetic flux that passes through the flat conductor sections 40 thereof is extremely low.

FIG. 8 is a perspective view of the stator 10 of the rotating electric machine. According to the above configuration, among the coils 22, 24, 26, 28 of four turns that are accommodated in the single slot 18 of the stator 10 of the rotating electric machine, only the coil 22 on the innermost peripheral side is provided with the magnetic body layer 42 while there is no necessity to provide the magnetic body layer 42 in the coils 24, 26, 28 on the outer peripheral side. Therefore, it is possible to increase the sectional area of the flat conductor section 40 in each of the coils 22, 24, 26, 28 by the thickness of the magnetic body layers 42 that are not provided in the coils 24, 26, 28, prevent the reduction in the space factor, and restrict the reduction in copper loss that is caused by providing the magnetic body layer 42.

What is claimed is:

1. A stator for a rotating electric machine, the stator comprising:
    a stator core having plural slots disposed in a circumferential direction of the stator core, the plural slots including a first slot; and
    a coil body located in the first slot and configured with a plurality of coils arranged in a single row along a radial direction of the stator core, each of the plurality of coils being wound for only one turn, wherein
    the plurality of coils includes first coils and second coils, and the first coils and the second coils are alternately disposed along the radial direction,
    each first coil is configured with a first flat conductor section, a first magnetic body layer provided around the first flat conductor section and a first insulating film provided around the first magnetic body layer, and
    each second coil is configured with a second flat conductor section and a second insulating film provided around and in direct contact with the second flat conductor section.

2. The stator according to claim 1, wherein
    the plurality of coils includes an innermost coil disposed on an innermost peripheral side of the first slot in the radial direction of the stator core, the innermost coil being a first coil.

3. The stator according to claim 1, wherein
    a magnetic permeability of the first magnetic body layer is hundreds of times higher than a magnetic permeability of the first flat conductor section.

* * * * *